Patented Aug. 21, 1945

2,383,128

UNITED STATES PATENT OFFICE 2,383,128

ACETYLSULPHANILYL CHLORIDE

Martin Everett Hultquist, Bound Brook, N. J., assignor to American Cyanamid Company, New York, N. Y., a corporation of Maine No Drawing. Application January 5, 1943, Serial No. 471,365

8 Claims. (Cl. 260—543)

This invention relates to an improved method of producing acetylsulphanilyl chloride, and more particularly to an improved method of drying the product.

Acetylsulphanilyl chloride is an important intermediate compound used in the preparation of sulphonamide drugs, and for many pharmaceutical processes it is essential that the product be of high degree of purity and that it be dry. The problem is quite serious because the acetylsulphanilyl chloride reacts with water, particularly at higher temperatures. In the ordinary method of preparation the acetylsulphanilyl chloride is obtained in the form of a slurry in dilute acid solution. The solid is obtained by filtering, washing with water and drying. The wet cake obtained contains some 40 to 50% of water, and in most cases traces of acid which are retained in the particles of the product, and the water and acid cause considerable decomposition of the product on drying. So serious has been this difficulty that expensive purification processes have been put into commercial use depending on recrystallization of the acetylsulphanilyl chloride from organic solvents. While such processes are capable of producing a dry acetylsulphanilyl chloride of high purity, they are very expensive and require elaborate equipment, and there is considerable loss of yield.

According to the present invention it has been found that acetylsulphanilyl chloride can be obtained in the dry form in a state of high purity by treating an aqueous slurry of the acetylsulphanilyl chloride with a water immiscible, inert organic liquid. A product is obtained which contains very little water, not over 5–15% together with the organic liquid, and the drying of the product results in complete removal of the water at high speeds and low temperatures due to the azeotropic effect of the added liquid.

The greater rapidity of drying and lower temperatures which are obtained by using the present invention are not the only advantages; in fact, they are probably not the most important factors. The effect of the water immiscible liquid is to drive most of the water contained in the particles of acetylsulphanilyl chloride to the surface and to wet these particles with a film of the water immiscible liquid. Thus, when drying is effected the expelled water is not actually in contact with the acetylsulphanilyl chloride and, therefore, does not react with it at the higher temperature encountered during drying. Decomposition of the acetylsulphanilyl chloride by reaction with water is, therefore, decreased to a very great extent both before and during the drying operation.

While excellent results are obtained with most inert water immiscible organic liquids of suitable volatility, it is sometimes desirable to incorporate some higher boiling liquids such as high boiling aromatic or aliphatic hydrocarbons so that a thin film of the high boiling liquid coats the particles of the acetylsulphanilyl chloride and tends to further protect them against absorption of moisture and decomposition on storage and handling.

It is also desirable, although not essential, to utilize small amounts of surface active agents which improve the rapidity of wetting of the acetylsulphanilyl chloride by the organic liquid, and the addition of such surface active agents constitutes a feature of a modification of the present invention which is desirable with liquids which do not readily wet acetylsulphanilyl chloride. The surface active agents will depend on the liquid used, among the most satisfactory being salts of dialkylsulphosuccinic acid such as sodium dioctylsulphosuccinate, salts of higher alkyl sulphuric acids such as sodium lauryl sulphate, the triethanolamine ester of lauric acid, and the like.

The range of liquids which can be used is wide since it is an advantage of the present invention that almost any inert organic liquid of suitable volatility may be used, such as petroleum hydrocarbons, toluene, ethylene dichloride, trichlorethane, and esters such as isopropyl acetate, or secondary butyl acetate. The principal solvent may be associated with higher boiling inert organic liquids such as high boiling petroleum hydrocarbons.

It is an advantage of the present invention that the method of procedure is not critical. In general it is desirable, however, to use only sufficient liquids so that the filter cake resulting is dry rather than pasty. Excess amounts of organic liquid do not perform any useful function and merely increase the cost of the process. The net result of the advantages of the present invention is that a rapid removal of water is obtainable in simple equipment with cheap organic liquids and a product is obtained which is much purer than ordinary acetylsulphanilyl chloride and correspondingly permits a better yield of sulphonamide compounds therefrom. The improvement in purity of the product will vary somewhat with the particular manipulative steps and the particular liquid used, but in general it is possible to materially increase the purity and to reduce the amount of water present before the drying operation. Thus a filter cake produced without any organic liquid will normally contain at most 50-60% of acetylsulphanilyl chloride. When an organic liquid is used according to the present invention the solids content of the cake is readily increased to 60-75%, which puts a much less severe load on the drying equipment, especially since the organic liquids, which now comprise most of the liquid in the cake, have low heats of vaporization and high vapor pressures at the drying temperatures. The reduced amount of water in the filter cake is also out of contact with the acetylsulphanilyl chloride as has been described above and hence does not react therewith during the drying.

The invention will be described in greater detail in conjunction with the following specific examples, the parts being by weight except for liquids which are expressed in the corresponding volume units.

Example 1

2600 parts of toluene are added to a slurry of 300 parts of acetylsulphanilyl chloride in 1700 parts of water, the temperature being maintained at 5-10° C. To the solution there is added 1.5 parts of sodium lauryl sulphate in 30 parts of water with thorough stirring. After some minutes of stirring the acetylsulphanilyl chloride and toluene separate from the water in the form of a soft mass. Stirring is continued for some time and the mixture is then filtered, producing a cake of acetylsulphanilyl chloride wet with toluene. This wet cake is then dried for several hours at 70° C. and a product is obtained which is better than 98.8% pure by chlorine determination and contains not over 0.2% of free amino compounds. When this product is condensed with 2-aminothiazole in pyridine by standard procedure a yield of about 96.7% of 2-(acetylsulphanilamido)thiazole is obtained, as compared with an 88% yield which is obtainable from a portion of the same acetylsulphanilyl chloride slurry filtered and dried in the absence of toluene.

Example 2

91.5 parts of mineral spirits having a boiling range of about 125-175° C. are added to a slurry of 1000 parts of water and 152 parts of acetylsulphanilyl chloride, the temperature being maintained at 5-10° C. and thorough stirring being effected during addition. There is then added to the mixture 0.76 part of the triethanolamine ester of lauric acid and stirring continued until the mixture breaks into two phases. The mixture is then filtered and the acetylsulphanilyl chloride cake dried at 70° C. The resulting product has a purity of more than 98% by chlorine analysis and contains only about 0.2% free amino compound.

Example 3

200 parts of isopropyl acetate are added to a slurry of 380 parts of acetylsulphanilyl chloride and 2000 parts of water, the temperature being maintained at 5° C. during the addition which takes place with constant stirring. The slurry is then treated with 50% caustic soda solution until no blue spot shows on Congo red test paper. The mixture is stirred at a temperature of 5-10° C. for 15 minutes, is then filtered and the cake dried at 70° C. The resulting product shows a purity of 98.8% by chlorine analysis and contains only about 0.2% free amino compounds.

Example 4

25 parts of isopropyl acetate and 50 parts of the predominantly aromatic petroleum product sold under the name "Solvesso No. 2," boiling from 130-188° C., are added to a slurry of 211 parts of acetylsulphanilyl chloride in 1800 parts of water. 50% sodium hydroxide solution is then added until no change is shown by Congo red or Brilliant Yellow test paper. During the addition temperature is maintained at 3-7° C. by the addition of ice to the mixture. The mixture is stirred for some time until the organic liquid is absorbed, then pumped to a centrifuge and whizzed as dry as possible. The cake is then dried at 50° C. and there is obtained a product having a purity of slightly over 98% by chlorine analysis with only 0.5% free amino compounds.

When another portion of a similar slurry of the same commercial batch is neutralized, centrifuged and dried without the presence of the organic liquid, but otherwise under the same conditions, the product obtained has a purity of only about 93.6% by chlorine analysis and contains 1% free amino compounds.

Example 5

150 parts of ethylene dichloride are stirred into a slurry of 450 parts of acetylsulphanilyl chloride in 150 parts of water, the temperature being maintained at 5-10° C. by the addition of ice and vigorous stirring being maintained. The stirring is continued until the liquid is absorbed. The product is then filtered on a suction filter and the cake dried at 50° C. The resulting product shows a purity of about 98% by chlorine analysis and contains 0.4% free amino compounds.

Example 6

160 parts of 1,1,2-trichloroethane are stirred into a slurry of 450 parts of acetylsulphanilyl chloride in 1500 parts of water, the temperature being maintained at 5-10° C. by the addition of ice. Stirring is then continued until the trichloroethane is absorbed, the mixture is filtered and the acetylsulphanilyl chloride dried at 50° C. A product somewhat in excess of 96% purity by chlorine analysis is obtained with 0.7% free amino compounds.

Example 7

250 parts of a secondary hexyl acetate having the formula:

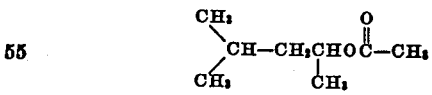

is mixed with 270 parts of an aliphatic petroleum spirit having a boiling range of 150-200° C. and sold commercially under the name "Varsol" is stirred into a slurry of 1050 parts of acetylsulphanilyl chloride in 6570 parts of water, ice being added to keep the temperature at 0-5° C. 50% caustic soda solution is then added to bring the pH to approximately 4-6 and stirring is continued until the "Varsol" is absorbed, whereupon the mixture is filtered and the cake dried at 70° C. A product of better than 98% purity by chlorine analysis is obtained, containing 0.3% free amino compounds. The dried product contains a thin film of the higher boiling portion of the petroleum spirits and has improved keeping properties.

Example 8

The procedure of Example 7 is followed but the hexyl acetate is replaced by the same amount of secondary butyl acetate. The product obtained has a purity of 98% by chlorine analysis with 0.2% free amino compounds and shows the same improved keeping characteristics as the product of Example 7.

In the examples the number of typical water immiscible inert organic liquids have been described. It should be noted that while the organic liquid must not be miscible with water it does not have to be water insoluble. As a matter of fact some of the best organic liquids such as the esters show some slight solubility in water. Slight solubility does no harm as it merely results in somewhat greater loss in the recovery of the organic liquid for reuse. It is, however, necessary that the liquid be immiscible with water; otherwise, water will not be expelled sufficiently completely from the acetylsulphanilyl chloride particles. The term "water immiscible" will be used in the claims in the above sense.

I claim:

1. A method of producing dry acetylsulphanilyl chloride from an aqueous slurry which comprises adding sufficient water immiscible inert organic liquid to the slurry to expel water out of the acetylsulphanilyl chloride, mechanically removing the major portion of the water and drying the resulting cake.

2. A method of producing dry acetylsulphanilyl chloride from an aqueous slurry which comprises adding sufficient water immiscible inert organic liquid in the presence of a small amount of wetting agent to the slurry to expel water out of the acetylsulphanilyl chloride, mechanically removing the major portion of the water and drying the resulting cake.

3. A method according to claim 1 in which the organic liquid contains low boiling constituents associated with sufficient high boiling constituents to leave a thin film of liquid on the acetylsulphanilyl chloride particles after drying.

4. A method according to claim 1 in which the organic liquid comprises an ester of acetic acid and a lower paraffin alcohol.

5. A method according to claim 1 in which the organic liquid contains an ester of acetic acid and a lower paraffin alcohol associated with a hydrocarbon mixture containing sufficient high boiling constituents to leave a thin film of hydrocarbon on the particles of acetylsulphanilyl chloride after drying.

6. A method according to claim 1 in which the organic liquid contains an isopropyl acetate associated with a hydrocarbon mixture containing sufficient high boiling constituents to leave a thin film of hydrocarbon on the particles of acetylsulphanilyl chloride after drying.

7. A method according to claim 1 in which the organic liquid contains a secondary butyl acetate associated with a hydrocarbon mixture containing sufficient high boiling constituents to leave a thin film of hydrocarbon on the particles of acetylsulphanilyl chloride after drying.

8. A method according to claim 1 in which the organic liquid contains a hexyl acetate associated with a hydrocarbon mixture containing sufficient high boiling constituents to leave a thin film of hydrocarbon on the particles of acetylsulphanilyl chloride after drying.

MARTIN EVERETT HULTQUIST.